United States Patent
Jungert

(10) Patent No.: US 6,953,218 B2
(45) Date of Patent: Oct. 11, 2005

(54) AIR-CONDUCTING DEVICE FOR A MOTOR VEHICLE

(75) Inventor: Dieter Jungert, Weissach (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/861,911

(22) Filed: Jun. 7, 2004

(65) Prior Publication Data

US 2005/0012359 A1 Jan. 20, 2005

(30) Foreign Application Priority Data

Jun. 6, 2003 (DE) .......................................... 103 25 654

(51) Int. Cl.⁷ .............................................. B62D 37/02
(52) U.S. Cl. .................. 296/180.1; 296/180.5
(58) Field of Search .......................... 296/180.1, 180.3, 296/180.5; 180/903

(56) References Cited

U.S. PATENT DOCUMENTS

| | | | | |
|---|---|---|---|---|
| 4,119,339 A | * | 10/1978 | Heimburger | 296/180.5 |
| 4,489,806 A | * | 12/1984 | Shimomura | 180/313 |
| 4,558,897 A | * | 12/1985 | Okuyama et al. | 296/180.5 |
| 4,659,130 A | * | 4/1987 | Dimora et al. | 296/180.1 |
| 4,904,016 A | * | 2/1990 | Tatsumi et al. | 296/180.5 |
| 4,976,489 A | * | 12/1990 | Lovelace | 296/180.1 |
| 2003/0116996 A1 | | 6/2003 | Soja et al. | |

FOREIGN PATENT DOCUMENTS

| | | | |
|---|---|---|---|
| DE | 3630645 | * | 3/1988 |
| DE | 101 60 748 | | 6/2003 |
| GB | 2017023 | * | 10/1979 |
| WO | WO 02/051688 | | 7/2002 |

* cited by examiner

Primary Examiner—Joseph D. Pape
(74) Attorney, Agent, or Firm—Crowell & Moring LLP

(57) ABSTRACT

An air-conducting element for a motor vehicle has an operating element and a flow-conducting element extending completely or partly over the vehicle width. The flow-conducting element can be displaced by the operating element from a moved-in inoperative position into a moved-out operative position. The flow-conducting element comprises an elastic and extensible material as well as, in a area of its free end, in a duct, a bending-elastic element which extends in the transverse direction of the vehicle and is displaceably accommodated in the duct. For an improved guidance of the bending-elastic element in the duct, it is provided that—viewed in the transverse direction of the vehicle—the bending elastic element, at least in sections, is supported by at least one guiding device arranged in the area of the free end of the flow-conducting element with respect to the wall bounding the duct.

19 Claims, 3 Drawing Sheets

AIR-CONDUCTING DEVICE FOR A MOTOR VEHICLE

BACKGROUND AND SUMMARY OF THE INVENTION

This application claims the priority of Application No. 103 25 654.7 filed in Germany on Jun. 6, 2003, the disclosure of which is expressly incorporated by reference herein.

The invention is based on an air-conducting device for a motor vehicle. Preferred embodiments of the invention relate to an air-conducting element for a motor vehicle, having an operating element and a flow-conducting element extending completely or partly over the vehicle width, by means of which operating element, the flow-conducting element can be displaced from a moved-in inoperative position into a moved-out operative position, and which flow-conducting element comprises an elastic and extensible material as well as, in the area of its free end, in a duct, a bending-elastic element which extends in the transverse direction of the vehicle and is displaceably accommodated in the duct.

From German Patent Document DE 101 60 748.2 (corresponding U.S. Pat. No. 2003/116996), which is a later publication, an air-conducting device of the above-mentioned type is known. It has an operating element and a flow-conducting element which extends completely or partly over the vehicle width. By means of the operating element, the flow-conducting element can be displaced from a moved-in inoperative position into a moved-out operative position. The flow-conducting element is made of an elastic and extensible material and has a duct in the area of its free end which extends in the transverse direction of the vehicle and in which a bending-elastic element is arranged in a sidable manner.

It is an object of the invention to optimize an air-conducting device of the initially mentioned type with respect to its function.

This object is achieved by means of an air-conducting element for a motor vehicle, having an operating element and a flow-conducting element extending completely or partly over the vehicle width, by means of which operating element, the flow-conducting element can be displaced from a moved-in inoperative position into a moved-out operative position, and which flow-conducting element comprises an elastic and extensible material as well as, in the area of its free end, in a duct, a bending-elastic element which extends in the transverse direction of the vehicle and is displaceably accommodated in the duct, wherein viewed in a transverse direction of the vehicle, the bending elastic element, at least in sections, is supported by at least one guiding device arranged in an area of a free end of the flow-conducting element with respect to a wall bounding the duct.

Further advantageous features of preferred embodiments of the invention are described herein and in the claims.

Important advantages achieved by means of the invention are that the bending-elastic element is displaceably guided with low friction in the duct when the flow-conducting element is displaced from the inoperative position into the operative position and vice versa. In addition to providing the displacement guidance, the guiding device also forms reinforcement in the flow-conducting element and accordingly provides a protective function against failure, for example, a tearing in the flow-conducting element from the free end.

In a particularly preferred embodiment the guiding device has a bending-elastic construction, whereby restoring forces are built up when the flow-conducting element is moved from the inoperative position into the operative position.

According to a further development the guiding device is constructed in a wire type manner and is wound in a helical line, such that a bending-elastic guiding device can be provided which is easy to produce and which, in addition, takes over the displacement guidance for the bending-elastic element.

According to certain preferred embodiments of the invention the guiding device is inserted into the duct and is supported on its wall. Thus, the guiding device can be inserted into the duct after the manufacturing of the flow-conducting element or can be placed, for example, injected or cast, into the flow-conducting element during the manufacturing of the flow-conducting element by breaking through the wall of the duct to project into the duct.

According to certain preferred embodiments, the bending-elastic element is constructed as a rod, particularly a fiber-reinforced plastic rod, which can be placed in the duct without high expenditures. The bending-elastic rod will then be supported at the guiding device, whereby the friction is avoided between the rod and the wall of the duct. The bending-elastic element may also be produced of a metallic material according to other contemplated embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
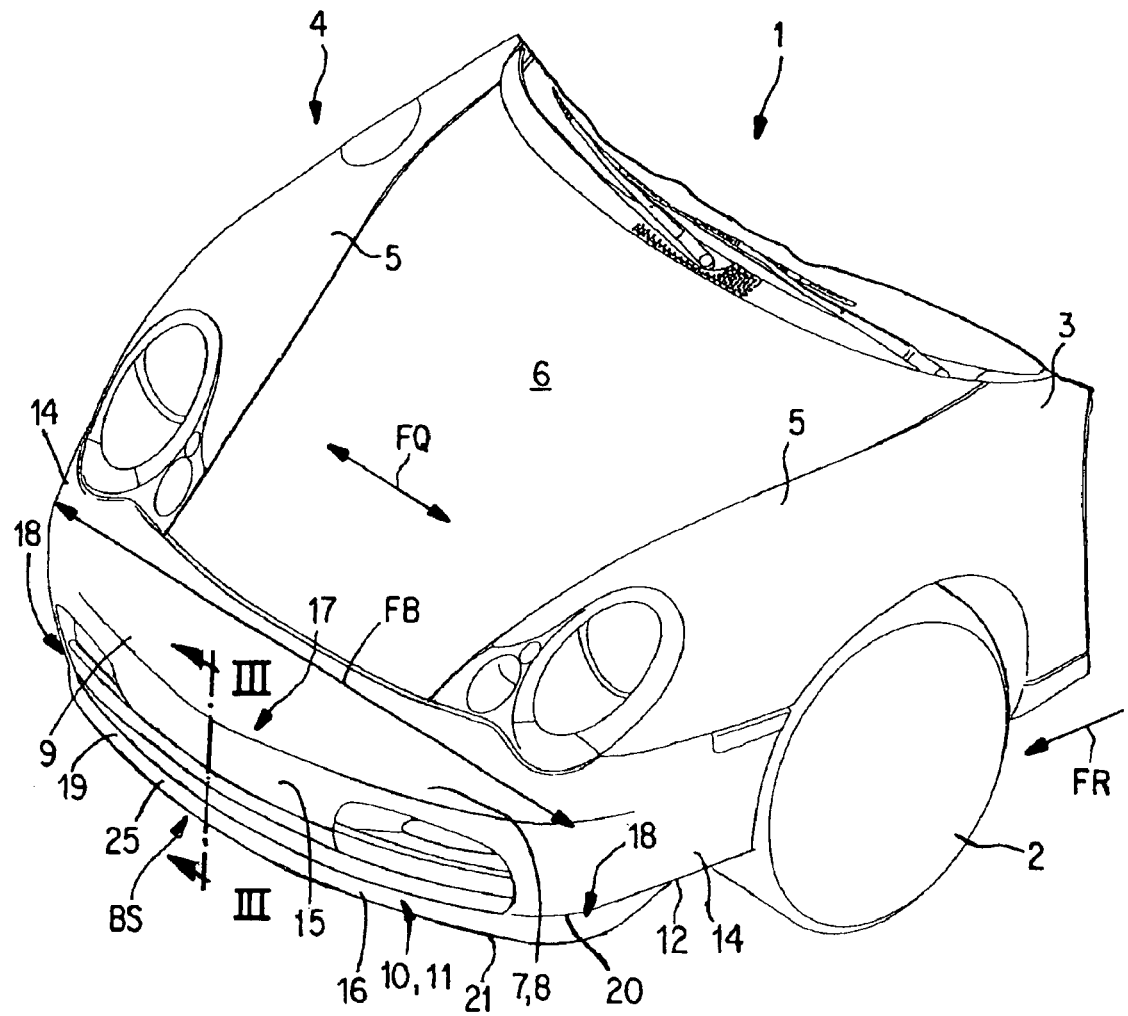
FIG. 1 is a perspective, cutout-type view of a motor vehicle with an air-conducting device, constructed according to preferred embodiments of the invention.

FIG. 1 partially illustrates a motor vehicle 1, only a front part 4 being shown of its vehicle body 3 carried by wheels 2. The front part 4 comprises lateral fenders 5 forming parts of the outer skin of the vehicle, a hood 6 arranged in-between, as well as a forward part 7 which is disposed in front of the hood 6 and the fenders 5 and which may represent a covering part 8 for a bumper (not shown) which can be arranged behind it. The forward part 7 therefore forms the forward end 9 of the motor vehicle 1 or of the front part 4. The motor vehicle 1 is equipped with an air-conducting device which in the following, as an example, will be assumed to be a front spoiler arrangement and will be described as such. However, it would also be conceivable to construct the air-conducting device 10 laterally, for example, as a side member covering or as a rear spoiler in the rear area.

Figure 2:
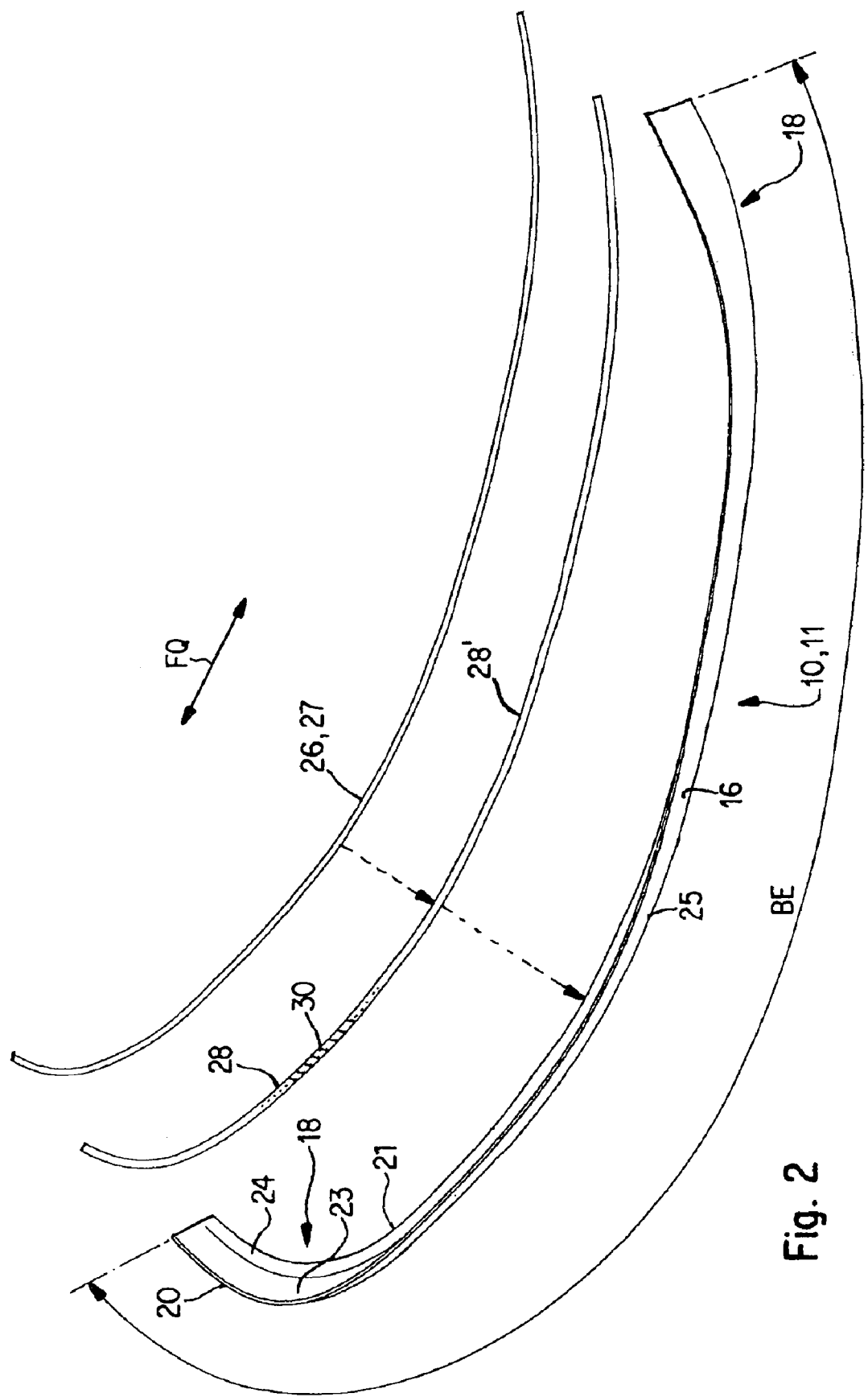
FIG. 2 is an exploded view of the air-conducting device according to FIG. 1.

By means of FIGS. 1 to 3, the air-conducting device 10 will be described in detail in the following. The air-conducting device 10 is assigned to the forward end 9 of the motor vehicle and is arranged particularly on an underside 12 of the front part 4, for example, on the lower section 13 of the front part 7 extending against the driving direction FR. In the area of the front part 7, the motor vehicle 1 has a vehicle width FB which is measured between lateral longitudinal sections 14 of the front part 7, which longitudinal sections 14 are connected by way of a base 15 of the therefore U-shaped front part 7.

The air-conducting device 10 has a flow-conducting element 16 which extends in a strip shape approximately over the vehicle width FB and may, in addition, extend around into the lateral longitudinal sections 14. Irrespective of whether the flow-conducting element 16 extends into the longitudinal sections 14, a contour is obtained for the course of the flow-conducting element 16, which contour follows the rounded contour 17 of the base 15 of the front part 7. Because the flow-conducting element 16 extends into the longitudinal sections 14, rounded corner areas 18 of the flow-conducting element 16 can be provided.

Figure 3:
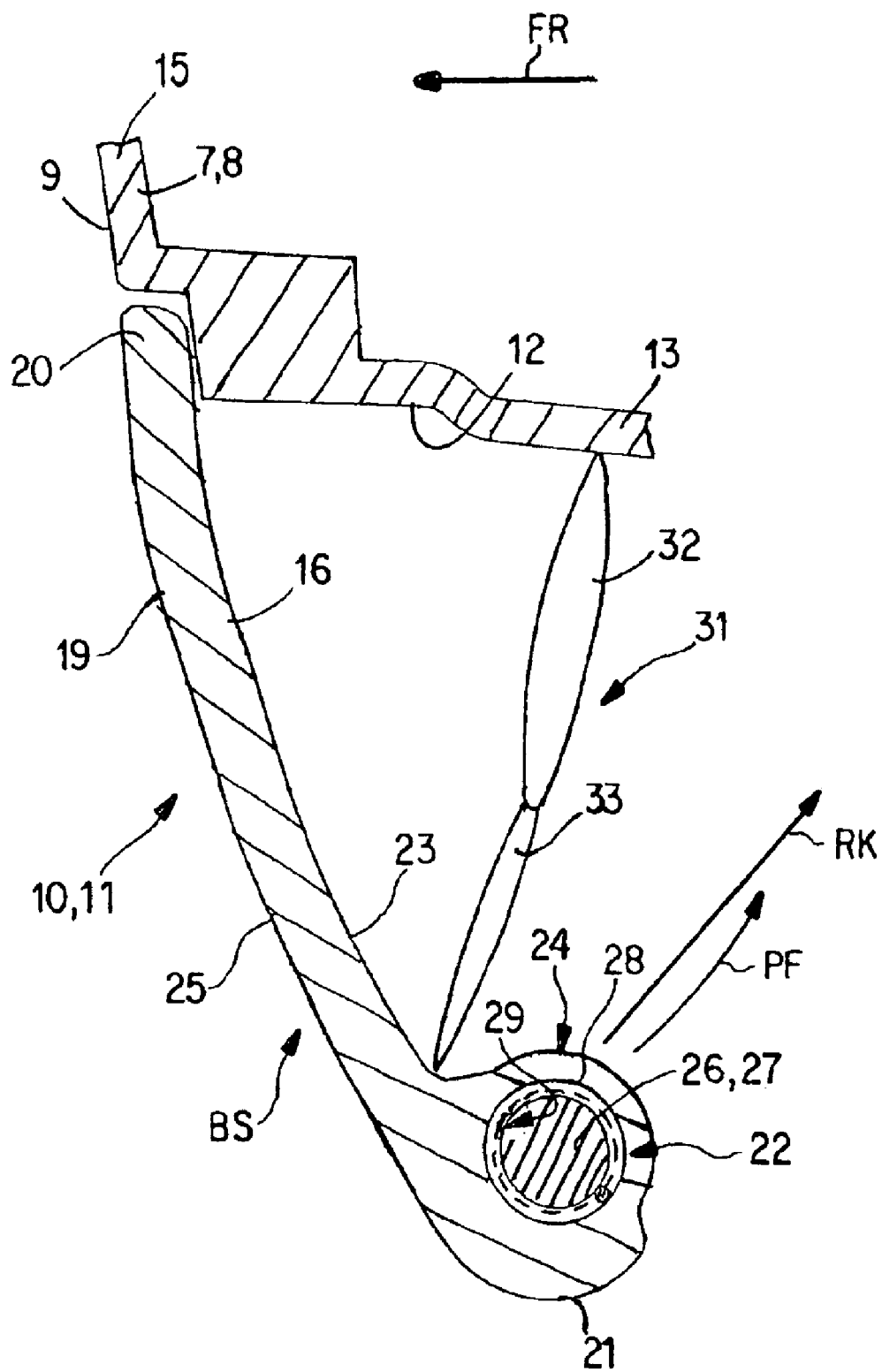
FIG. 3 is a sectional view of the air-conducting device along Line III—III in FIG. 1.

In FIGS. 1 and 3, the flow-conducting element 16 is illustrated in a moved-out operative position BS, in which the flow-conducting element 16 represents a downward-oriented extension of the forward part 7 so that, in this operative position BS, the flow-conducting element 16 assists in the driving operation of the motor vehicle 1, depending on desired definitions, such as for example, a favorable drag coefficient, optimized output forces, or the like, its aerodynamic characteristics are influenced. The flow-conducting element 16 can be moved from the illustrated operative position BS in the direction of the arrow PF into a, for example, approximately horizontal, definitely moved-in inoperative position, which is not shown here, in which it achieves essentially no effect at the motor vehicle influencing the air flow. In the inoperative position, the flow-conducting element 16 may be situated adjacent to the underside 12 or at a narrow distance thereto.

The flow-conducting element 16 has a fastening end 20 by means of which it is connected with the forward part 7. Opposite the fastening end 20, the flow-conducting element 16 has a free end 21, into whose area a duct 22 is placed which in FIG. 3 extends perpendicular to the plane of the drawing and which may extend approximately over the entire width BE (FIG. 2) of the flow-conducting element 16. In particular, in the area of the free end 21, the duct 22 is placed in a thickening 24 constructed on the rear side 23 of the flow-conducting element 16, so that the smooth forward side forming the flow-conducting surface 25 is not influenced by the duct 22. The flow-conducting element 16 is made of an elastic and extensible material, such as an elastomer, and a bending-elastic, if required, also tension-elastic element 26 is displaceably in the transverse direction FQ of the vehicle received in the duct 22. The displaceable guidance of the bending elastic element 26 is necessary because the flow-conducting element 16, when moving out from the inoperative position into the operative position BS, is stretched in the direction of its width BE, and contracts again when it moves back into the inoperative position. The bending-elastic element 26 is constructed particularly as a fiber-reinforced plastic rod 27, which is visible in FIG. 2, at least some of the fibers of the rod 27, which are not shown, being aligned to extend mainly in the transverse direction FQ of the vehicle.

In order to reduce the friction at the bending-elastic element 26, which is arranged in the flow-conducting element 16, during the sliding of the element 26 within the duct 22, a guiding device 28 for the element 26 is inserted as a displacement guide in the duct 22, which projects over the wall 29 bounding the duct 22 and thus supports the bending-elastic element 26 with respect to the wall 29, and thus holds it at a distance from the wall 29. The guiding device 28 can—in one or more parts—extend along the entire width BE of the flow-conducting element 16, which is illustrated in FIG. 2, or—viewed in the transverse direction FQ of the vehicle—may be provided in one or more parts only in sections. In order to be able to follow during the in-movement and out-movement of the flow-conducting element 16, the guiding device 28 has a bending-elastic construction—particularly in the case of a one-piece construction over the width BE, so that the bending-elastic element 26 is supported in any position of the flow-conducting element 16 with respect to the wall 29 of the duct 22. The guiding device 28 can be constructed as an elongated sleeve 28' (FIG. 2) or—as outlined by a helical line 30 in FIG. 2—may be constructed in a wire-type manner, and may be wound following the helical line. The guiding device 28 can therefore be implemented as a coil spring which is inserted such into the duct 22 that it projects beyond the wall 29.

Together with the manufacturing of the flow-conducting element 16, the guiding device 28 can be cast into the flow-conducting element 16, so that it breaks through the wall 29 of the duct 22 and projects into the duct 22, and thus supports the bending-elastic element 26 with respect to the wall 29. However, it is also conceivable to insert the guiding device 28 into the duct 22 left open during the manufacturing of the flow-conducting element 16, so that it is placed against the wall 29 and is therefore arranged completely inside the duct 22.

The guiding device 28 may be produced of a plastic material of a low coefficient of friction, as required, of a sliding bearing material. A preferred embodiment has a wire-type guiding device 28, which is wound following the helical line 30, and is constructed of a spring steel wire. In this embodiment, restoring forces RK are built up during the out-movement of the flow-conducting element 16 from the inoperative position into the operative position BS, which restoring forces RK are added to the restoring forces RK applied by the bending-elastic element 26.

For operating the flow-conducting element 16, thus for the in-movement and the out-movement, the air-conducting element 10 is equipped with an operating element 31 which is only outlined here and which extends between the underside 12 of the forward part 7 and the rear side 23 of the flow-conducting element 16 and is constructed particularly as an inflatable and dischargeable hose which has at least one chamber 32 or 33, which can be connected with a compressed-air source not shown here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air-conducting element for a motor vehicle, having an operating element and a flow-conducting element extending over the vehicle width, the flow-conducting element being displaceable by the operating element from a moved-in inoperative position into a moved-out operative position, the flow-conducting element comprising an elastic and extensible material, a duct in an area of a free end of the flow connecting element, and a bending-elastic element which extends in the transverse direction of the vehicle and is displaceably accommodated in the duct, wherein, viewed in a transverse direction of the vehicle, the bending elastic element, at least in sections, is supported by at least one guiding device arranged in the area of the free end of the flow-conducting element with respect to a wall bounding the duct.

2. Air-conducting device according to claim 1, wherein the guiding device has a bending-elastic construction.

3. Air-conducting device according to claim 1, wherein the guiding device is constructed in a wire-type manner and is wound following a helical line.

4. Air-conducting device according to claim 2, wherein the guiding device is constructed in a wire-type manner and is wound following a helical line.

5. Air-conducting device according to claim 1, wherein the guiding device viewed in the transverse direction of the vehicle extends along approximately the vehicle width of the flow-conducting element.

6. Air-conducting device according to claim 1, wherein the guiding device is inserted into the duct and is supported on the wall bounding the duct.

7. Air-conducting device according to claim 1, wherein the guiding device is placed in the flow-conducting element, breaks through the wall bounding the duct and projects into the duct.

8. Air-conducting device according to claim 1, wherein the bending-elastic element is constructed as a rod.

9. Air-conducting device according to claim 7, wherein the rod is constructed as a fiber-reinforced plastic rod.

10. An air deflecting assembly for a vehicle comprising:
a flow conducting element which in use extends laterally adjacent a vehicle outer body surface, said flow conducting element being formed of an elastic extensible material and including a duct disposed in a free end area of the flow conducting element,
a bending elastic element displaceably accommodated in the duct, and
at least one guiding device disposed in the duct for guiding the bending elastic element.

11. An air deflecting assembly according to claim 10, wherein the guiding device in use is interposed between an interior wall of the duct and the bending elastic element.

12. An air deflecting assembly according to claim 11, wherein the guiding device has a bending-elastic construction.

13. An air deflecting assembly according to claim 11, wherein the guiding device is constructed in a wire-type manner and is wound following a helical line.

14. An air deflecting assembly according to claim 11, wherein the guiding device is inserted into the duct and is supported on interior wall of the duct.

15. An air deflecting assembly according to claim 11, wherein the guiding device is placed in the flow-conducting element, breaks through the interior wall of the duct and projects into the duct.

16. An air deflecting assembly according to claim 11, wherein the bending-elastic element is constructed as a rod.

17. An air deflecting assembly according to claim 16, wherein the rod is constructed as a fiber-reinforced plastic rod.

18. An air deflecting assembly according to claim 11, comprising an operating mechanism operable to selectively move the flow conducing element between a moved-in inoperative position and a moved-out operative position.

19. An air deflecting assembly according to claim 18, wherein the flow-conducting element is connected in use to a vehicle body part at the end of the flow conducting element which is opposite the free end.

* * * * *